Sept. 5, 1967   C. F. LAWRENZ   3,340,121
METHOD OF APPLYING DECORATIVE COATINGS TO METAL PARTS
Filed Dec. 20, 1963

Inventor
Carl F. Lawrenz
Dawson, Tilton, Fallon
Lungmus & Alexander
Attorneys

3,340,121
METHOD OF APPLYING DECORATIVE COATINGS TO METAL PARTS
Carl F. Lawrenz, 8115 N. Kolmar Ave., Skokie, Ill. 60076
Filed Dec. 20, 1963, Ser. No. 332,047
2 Claims. (Cl. 156—233)

This invention relates to a method of applying decorative metallic coatings to metal parts of substantial mass such as, for example, metal castings and stampings of substantial size and weight. The invention is particularly suitable for use in applying decorative metal coatings or imprints to metal parts which are already painted or otherwise finished.

As is well known, heat transfer techniques are commonly used to apply thin metallic decorative coatings to plastic parts. Such a technique or process involves the use of a tape bearing a thin metallic coating, the tape being pressed against the plastic part by a heated iron. The metal coating of the tape then transfers to the plastic part in the specific area contacted by the iron.

While such a procedure is suitable for use in applying decorative metal metallic coatings to plastic parts, it has been found clearly unsuitable for applying similar coating to metal parts. The reason apparently lies in the heat conductivity of the receiving metal body; such conductivity resulting either in no transfer at all (or an incomplete transfer), or a transfer of substantially the entire metal coating carried by the tape or sheet.

Accordingly, it is a principal object of the present invention to provide a method for transferring a metallic coating from a transfer tape or sheet to the receiving surface of a metal body without at the same time encountering the aforementioned difficulties or disadvantages. Specifically, it is an object of the present invention to provide a simple and highly effective heat transfer method for transferring a metallic layer from a transfer sheet to a metal body of substantial mass and relatively high heat absorbing characteristics.

Other objects will appear from the specification and drawings in which.

An important aspect of the present invention lies in the recognition that metal parts are not suitable for receiving metal coatings by conventional heat stamping techniques because of the rapid dissipation or absorption of heat into such parts, and in the further recognition that such absorption and the problems resulting therefrom may be overcome by preheating the metal part. When the part is preheated to a temperature exceeding the melting point of the thermoplastic release layer of the transfer sheet, contact between the transfer sheet and the preheated metal part will result in a transfer of the metallic coating without the difficulties and problems previously encountered.

Figure 1:
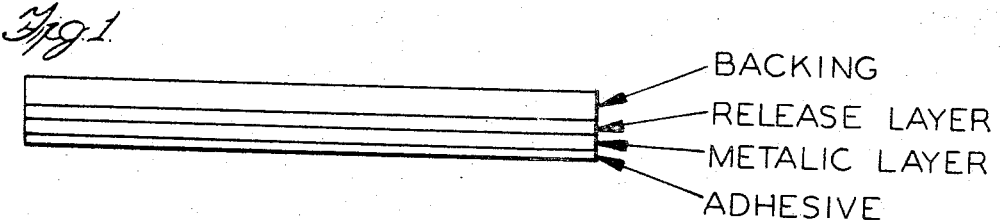
FIGURE 1 is a side elevational view of a transfer sheet suitable for use in the method of the present invention.

FIGURE 1 illustrates in diagrammatic fashion a transfer sheet comprising a flexible backing, a release layer applied directly to the backing, a metallic layer adjacent the release layer, and an adhesive layer coating the metallic layer. The backing may be formed from a fibrous material, such as paper, or from a thermosetting plastic material, such as a polyester sheet or film. Other thermosetting plastics (such as polyurethane) may be used, and non-thermosetting or thermoplastic materials may be used if their melting temperatures are substantially higher than the temperature at which transfer is to take place. Thus, high temperature thermoplastic polyamides or fluorocarbons might be used for the backing layer.

The release layer is formed of a thermoplastic material compatible with the backing of the transfer sheet. A release layer of polyvinyl chloride has been found particularly suitable although other thermoplastic materials having similar characteristics may be used such as, for example, cellulose acetate, cellulose acetate-butyrate, polyvinylidene chloride or acrylics.

Adjacent the thermoplastic release layer is a metallic layer comprising a film of aluminum or other suitable metal. The outer surface of this metallic layer is coated with an adhesive which is capable of reaching a softened state of tackiness at about the same temperature as the softening or melting temperature of the release layer. Any suitable thermoplastic adhesive may be used as long as it is compatible with the metallic layer and with the paint finish of the receiving metal body. For example, resin adhesives formed from vinyl acetals, vinyl acetate, vinyl alcohol, vinyl chloride copolymers, vinylidene copolymers, cellulose acetate, cellulose acetate-butyrate, cellulose nitrate, methyl cellulose, acrylics, or rubber-based adhesives are effective for this purpose.

The metal piece to which the decorative metallic finish is to be applied may be cast, stamped, or formed in any other customary way and comprises a body of substantial mass and relatively high heat absorbency. While the process of the present invention may be practiced with metal pieces of relatively small mass, the problems encountered in the prior art and overcome by my invention involve the application of decorative finishes to metal parts which are large enough to absorb and dissipate the heat which would flow from a heated iron during a normal hot-stamping operation.

Figure 2:
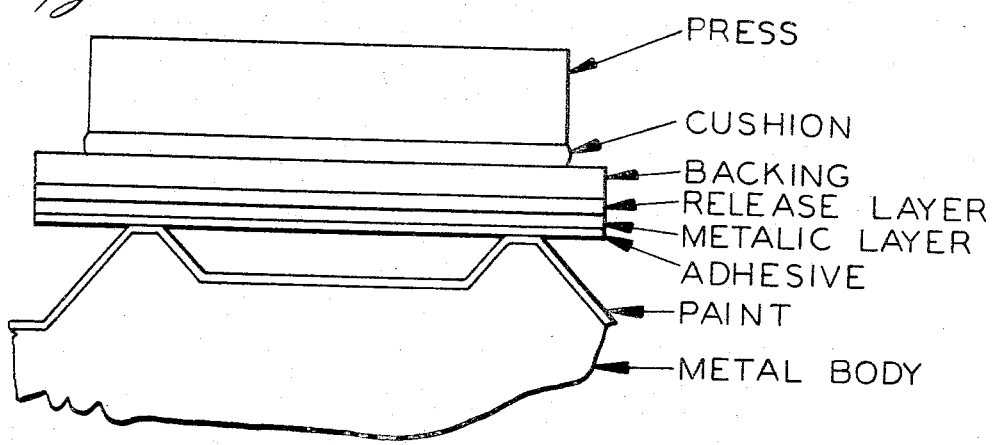
FIGURE 2 is a side elevational view illustrating a step in the present method.

The metal part will in most instances be painted prior to the application of the decorative metallic finish. Thus, in FIGURE 2 it will be seen that the metal part is provided with an uneven top surface having a layer of paint applied thereto. For purposes of the present invention, it is important that the paint be compatible with the adhesive coating of the transfer sheet. Preferably, the paint should have thermoplastic characteristics similar to those of the adhesive coating and of the release layer. Thus, where the paint is a vinyl composition, it is important that the adhesive resin and the plastic release layer also be of vinyl composition having approximately the same softening or melting temperature ranges, or that the adhesive coating and release layer at least be of compositions which are compatible with the paint finish and which soften at a temperature which is not substantially higher than the softening temperature of the paint. As used herein, "paint" refers to any surface coating on the formed metal part and is intended to include lacquers and enamels within such definition.

In carrying out the method of the present invention, I first preheat the metal body to a temperature above the softening temperature of the release layer of the transfer sheet. After the metal body has been preheated, the transfer sheet, which may be a portion of a roll of transfer tape, is brought into contact with the part and is held thereagainst by a suitable element such as the pressing element diagrammatically illustrated in FIGURE 2. The pressing element is provided with a resilient cushion for distributing force uniformly over the surfaces of the metal body contacted by the transfer sheet. Preferably, the press is formed of a material which is low in heat conductivity and absorbency, such as wood, or, if formed of metal, the resilient cushion is composed of a heat insulating material such as asbestos. Where the press or its cushion are low in heat conductivity, and absorbency, no preheating of the press is necessary; however, should the press and cushion be formed of materials having high heat conductivity, then heating of the press to a temperature of approximately the temperature of the preheated metal part is required.

Figure 3:
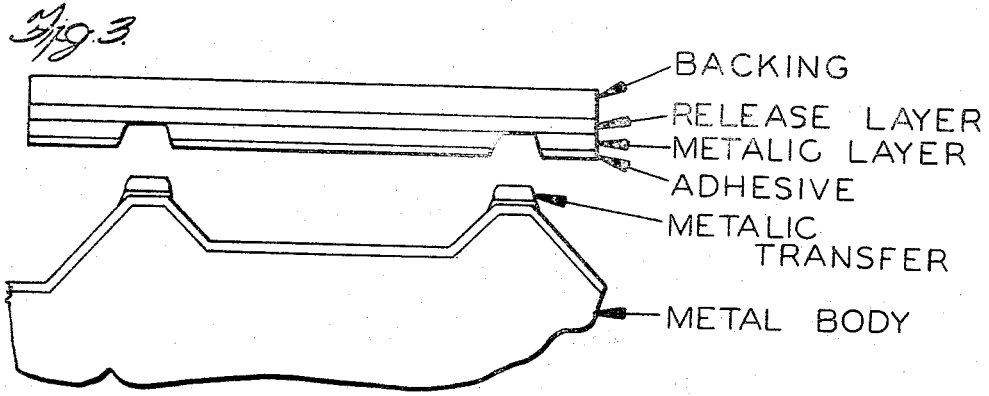
FIGURE 3 is a side elevational view similar to FIGURE 2 but showing the parts after transfer is completed.

The transfer sheet is held in contact with the metal body until the thermoplastic release layer has sufficiently softened or melted adjacent those portions of the transfer sheet which contacts the surfaces of the metal body to permit separation of such portions of the metallic layer from the backing. Thereafter, the transfer sheet and metal body are separated (FIGURE 3) leaving the embossed surfaces of the metal body coated with the metallic layer (or selected portions thereof) adhesively secured to such body.

It has been found that by preheating the metal body to a temperature above the softening temperature of the release layer prior to contact with the transfer sheet, a clean transfer of the metallic layer to the raised and contacted portions of the metal body is obtained. Since the heat for effecting the transfer is imparted to the transfer sheet by the metal body itself, the problems of heat absorption and dissipation which formerly resulted either in incomplete or excessive transfer of the metallic layer are avoided.

While in the foregoing I have disclosed an embodiment of the invention in considerable detail for purposes of illustration, it will be understood by those skilled in the art that many of these details may be varied without departing from the spirit and scope of the invention.

I claim:
1. In a method for transferring a metallic layer from a transfer sheet to a preformed metal body having a finish coating thereon, said sheet consisting essentially of a backing, a thermoplastic release layer on said backing, a metallic layer on said release layer, and an adhesive layer on said metallic layer, said finish coating being compatible with said adhesive layer, the steps comprising (1) preheating said metal body to a temperature above the softening temperature of said release layer, (2) positioning said transfer sheet adjacent said preheated body, (3) contacting the backing of said transfer sheet with pressing means to urge the adhesive layer of said transfer sheet into contact with said preheated metal body, (4) maintaining said transfer sheet in contact with said body until the release layer has passed into a softened state, and (5) thereafter withdrawing said pressing means and removing said backing from said metal body and from the metallic layer transferred to said body.

2. In a method for transferring a metallic layer from a transfer sheet to portions of a preformed metal body having a finish coating thereon, said body portions extending outwardly from the remainder of said body, said sheet consisting essentially of a backing, a thermoplastic release layer on said backing, a metallic layer on said release layer, and an adhesive layer on said metallic layer, said finish coating being compatible with said adhesive layer, the steps comprising (1) preheating said metal body to a temperature above the softening temperature of said release layer, (2) positioning said transfer sheet adjacent said preheated body, (3) contacting the backing of said transfer sheet with pressing means to urge the adhesive layer of said transfer sheet into contact with said preheated metal body, (4) maintaining said transfer sheet in contact with said body until the release layer has passed into a softened state, and (5) thereafter withdrawing said pressing means and removing said backing from said metal body and from the metallic layer transferred to said body.

References Cited
UNITED STATES PATENTS

| | | | |
|---|---|---|---|
| 2,367,250 | 1/1945 | Warth et al. | 156—322 |
| 2,635,974 | 4/1953 | Terry | 161—406 X |
| 2,703,772 | 3/1955 | Keithly | 156—239 X |
| 3,043,728 | 7/1962 | Stauffer | 156—231 |
| 3,138,505 | 6/1964 | Hirsch | 156—289 X |

EARL M. BERGERT, *Primary Examiner.*

M. L. KATZ, *Assistant Examiner.*